Dec. 12, 1950     S. GUARNASCHELLI     2,534,198
SELF-FLARING PIPE COUPLING

Filed March 11, 1947

INVENTOR.
Stephen Guarnaschelli
BY
Johnson, Kline and Hensel
ATTORNEYS

Patented Dec. 12, 1950

2,534,198

UNITED STATES PATENT OFFICE 2,534,198

SELF-FLARING PIPE COUPLING

Stephen Guarnaschelli, Naugatuck, Conn., assignor to The Brockway Company, Naugatuck, Conn., a corporation of Connecticut Application March 11, 1947, Serial No. 733,843

3 Claims. (Cl. 285—86)

This application relates to an improvement in couplings for threadless ductile pipe, tubing, conduit or other elongated tubular fittings (hereinafter called "pipe"), particularly couplings of the type adapted to form a flare on the pipe when the coupling or connection is made up.

It has been known for many years to make connections using ductile threadless pipe having a pre-formed flare on the end thereof, by using a pair of coupling members interconnected by suitable draft means, and having a pair of flare-engaging and clamping surfaces adapted respectively to clamp against the rear and front surfaces of the flare on the pipe so as to clamp the same in leaktight engagement.

In order to assemble installations in which random lengths of pipe are required, it was necessary to employ a flare-forming tool to flare the end of the pipe on the job after it was cut the desired length. The necessity of having such tools available presented a substantial inconvenience for the workman. Often when it was necessary to make emergency repairs or replacements in existing installations, such tools were not immediately available and serious losses in time and expense were caused.

It has been proposed heretofore to manufacture self-flaring couplings wherein the coupling parts themselves are adapted to form a flare on the pipe incidental to making up the connection, but such couplings generally require special construction often unavailable or unsuitable for use in installations including the common forms of couplings used with pre-flared pipe.

In accordance with this invention, standard forms of couplings are modified in a simple and inexpensive manner to render them capable of forming a flare on the end of a length of ductile threadless pipe incidental to making up the connection, such modification interfering in no way with the use of the coupling in the conventional manner for connecting pre-flared pipe. Thus, couplings including the modification of my invention are adapted for use in all kinds of installations, insuring the possibility of making rapid installations, repairs or replacements with a minimum of inconveniene or loss of time, and without the necessity of maintaining a supply of special tools for carrying out the job.

Thus, the coupling in accordance with my invention, comprises a pair of coupling members, one of which encircles a length of ductile threadless pipe behind the end thereof, said coupling member having a flare-engaging and clamping surface on its leading end, adapted to engage the rear side of a flare on the end of the pipe. The other coupling member has a flare-clamping projection, usually of conical form, for engaging the front of the flare on the end of the pipe. The two members are interconnected by draft means, such as complementary threads on the flare-clamping members themselves, or on a draft member or members associated with them, for advancing the flare-engaging surfaces into flare-clamping relation with the flared end of a pipe.

In accordance with my invention, I provide in the coupling member which is adapted to encircle the pipe behind the flare, means for anchoring said member to the ductile pipe against axial displacement thereon, said means being independent of the connecting or coupling operation of the coupling or draft members; preferably, said independent clamping means comprises one or more set screws disposed in lateral apertures in the coupling member, which are adapted to bite into the wall of a pipe inserted through the bore of the coupling member. Preferably, the set screws, when tightened against the pipe, are flush or level with the outside surface of the coupling member or below the level of said surface, so that they do not interfere with any other part of the coupling.

When a coupling member comprising the aforesaid modification, is used with pre-flared pipe, the set screws can be removed or left loose in their apertures without interfering with the normal flare-clamping operation of the coupling. However, when the pipe is not pre-flared, the coupling member comprising the independent anchoring means, particularly the set screws, is placed over the end of the ductile pipe to be connected, and positioned thereon so that an end portion of the pipe, sufficient to form the required flare, projects beyond the leading end of the bore of said coupling member adjacent the flare-clamping surface thereof. The independent anchoring means or set screws are tightened against the pipe so as to hold the coupling member firmly in place against axial displacement. The opposite coupling member, having the conical projection, is then advanced by operation of the draft means toward the projecting end of the pipe. When it engages the end of the pipe, it is forced into the same causing the pipe to flare thereover. Final tightening of the draft means clamps the resulting flare between the clamping surfaces of the respective coupling members to form a leaktight connection therewith.

When it is impractical to permit the pipe to rotate relative to the coupling member having the conical projection, a draft member is preferably provided which engages the opposite coupling member encircling the pipe, but which is rotatable relative thereto so as to advance the anchored flare-clamping members and the pipe toward the projecting end of the opposite coupling member, without requiring corresponding rotation of the pipe.

Should the coupling be constructed without the foregoing feature, and it is nevertheless necessary to connect un-flared pipe by means of suitable coupling members, the two members can be first used as flare-forming tools before installation of the pipe, and then, after the flare has been formed, the set screws or other anchoring means can be released or removed, and the coupling employed in the usual manner for connecting the pipe which is now pre-flared.

My invention will be more fully understood from a number of preferred embodiments thereof, hereinafter described with reference to the accompanying drawings, wherein.

Figure 1:
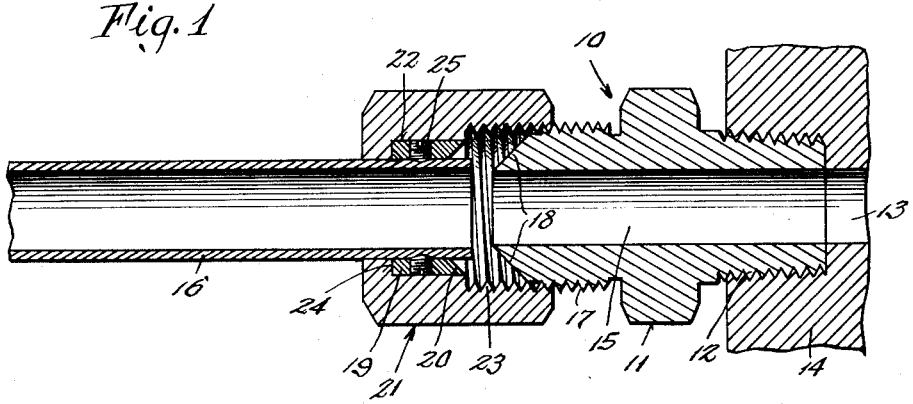
Figure 1 is an axial cross-section of a coupling in accordance with my invention, assembled preparatory to the flare-forming operation.
Figure 2:
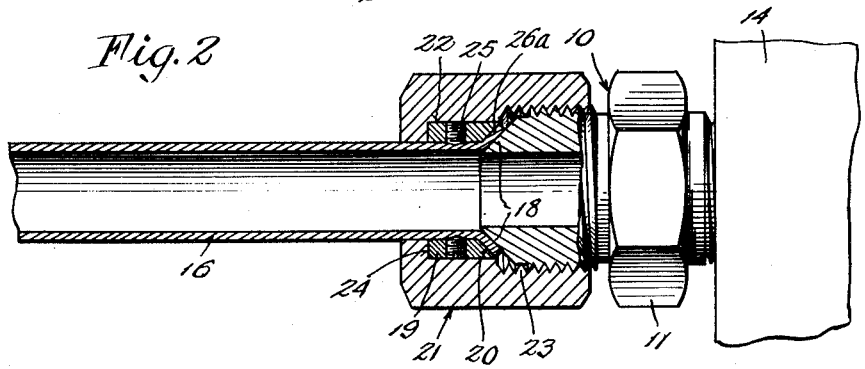
Fig. 2 is an axial cross-section of the coupling of Fig. 1 after the same has been made up.

Referring to the drawings, the coupling shown in Figs. 1 and 2 comprises, as one coupling member, a standard S. A. E. type fitting 10, having a central nut portion 11 of hexagonal or other conventional shape for engaging a wrench, and a threaded rear end 12 for securing the fitting in a threaded orifice of a passage 13 in a structure 14. The fitting 10 has a longitudinal bore 15 extending therethrough for communicating with the passage 13 and with a length of ductile pipe 16 to be connected to the front end of the fitting. The front end of the fitting has external threads 17, and terminates at a conical projection or nose 18, adapted to engage and be clamped against the front side of the flare on the end of a piece of ductile pipe.

The coupling further comprises a ferrule 19, having a bore adapted slidably to receive the threadless ductile pipe 16, and having a re-entrant conical flare-clamping surface 20 at its forward end, for engaging and clamping against the rear side of a flare on the end of the pipe 16. The coupling further includes a draft member or hollow nut 21 having a cavity 22 therein adapted to receive the ferrule 19 at its inner end, and having internal threads 23 at the outer end of said cavity for engaging the threads 17 on the front end of the fitting 10. At its rear, the nut 21 has a flange or shoulder 24 surrounding an aperture adapted to receive the ductile pipe 16, said shoulder engaging the rear end of the ferrule 19 to advance the same toward the conical projection 18 of the fitting 10 when the nut is threaded on to the leading end of said fitting.

In accordance with my invention, the ferrule 19 has a number of lateral threaded apertures therein in which set screws 25 are disposed. In order to use the coupling for flaring and connecting the pipe 16 to the fitting 10, the ferrule 19 is slipped over the end of the pipe 16 so that an end portion 26 of the pipe, adapted to form the desired flare, projects from the bore of the ferrule adjacent the re-entrant conical flare-clamping surface 20. The set screws 25 are tightened so that they indent or bite into the wall of the pipe 16, thus securely anchoring the ferrule 19 against axial movement on the pipe. When thus secured, the outer ends of the set screws 25 are flush or below the level of the outer surface of the ferrule 19, so that they do not interfere with insertion of the ferrule into the base of the cavity 22 in the nut 21.

The nut 21 is positioned on the pipe 16 behind the ferrule 19, and is advanced along the pipe until the ferrule is seated in the base of the cavity 22 in the nut. The latter is then threaded onto the leading end of the fitting 10, advancing the ferrule 19 together with pipe 16 toward the conical flare-clamping surface 18 on the fitting 10. The nut 21 rotates freely relative to the ferrule 19, so that there is no tendency during the threading operation to rotate the pipe 16. As the leading end 26 of the pipe 16 engages the conical surface 18 on the fitting, and advancement is continued, the pipe end 26 rides up over said conical surface and is flared thereby, as shown in Fig. 2. Final tightening of the nut 21 clamps the flared end 26a of the pipe firmly between the surface 20 on the ferrule and the conical surface 18 on the fitting, forming a leaktight connection between the fitting 10 and the pipe 16.

Figure 3:
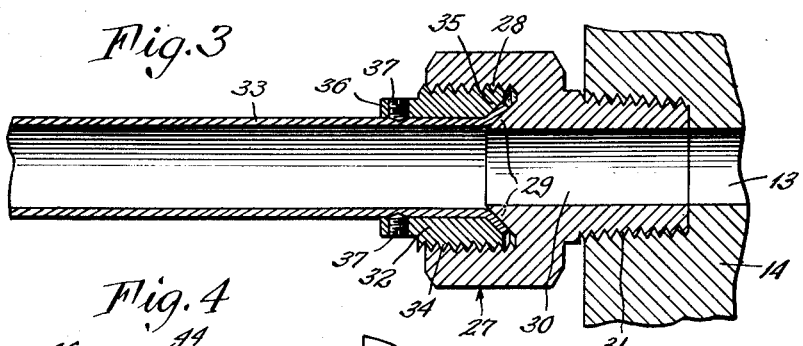
Fig. 3 is an axial cross-section of a connection made with standard coupling members, modified to embody my invention.
Figure 4:
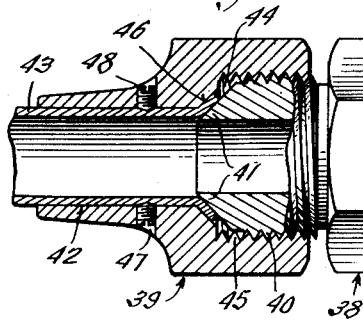
Fig. 4 is likewise an axial cross-section of a connection with another type of standard coupling, similarly embodying my invention.

Applications of my invention to standard types of fittings are shown in Figs. 3 and 4. In Fig. 3, the coupling comprises only two coupling members, the fitting 27 including a hollow nut portion having an internally threaded cavity 28 therein with a conical flare-engaging projection 29 at the base of the cavity. A bore 30 extends from the rear end of the fitting to the end of said projection, and is adapted to communicate with passage 13 in the structure 14. The rear end of the fitting 27 has a threaded portion 31 (like fitting 10) for securing the same in the orifice of passage 13. The opposite coupling member is a sleeve 32 having a bore adapted to receive the threadless ductile pipe 33, and having external threads 34 for engaging the internal threads in the cavity 28. At its leading end, the sleeve 32 has a re-entrant conical flare-engaging surface 35 adapted to cooperate with the flare-engaging projection 29 to clamp the flared end of a pipe between them when the sleeve 32 is threaded into the cavity 28. At its rear end the sleeve 32 has a projection 36 adapted to engage a wrench, and provided with a number of lateral threaded apertures for receiving set screws 37.

In using this form of fitting, the sleeve 32 is positioned on the end of the pipe 33 with the end portion thereof projecting from the bore at the leading end of the sleeve, adjacent the flare-engaging surface 35. The projecting end of the pipe is of the proper length to form the desired flare in making the connection. The set screws 37 are tightened against the pipe 33 so as to anchor the sleeve securely thereon. The sleeve 32 is then threaded into the cavity 38 of fitting 27 whereby the projecting end portion of the pipe is forced to ride up over the conical projection 29 at the base of the cavity 28, flaring the pipe; and the resulting flare formed is then clamped between conical surface 35 and the conical projection 29, forming a leaktight connection between the pipe 33 and fitting 27.

In this coupling, rotation of the pipe occurs during the making up of the coupling for flare-forming operation thereof. If this is impractical in carrying out the installation, the same operations may be carried out before securing the fitting 27 in the orifice of the passage 13 so that in effect the coupling members constitute a flare-forming tool. Thereupon the set screws 37 are loosened or removed, and the coupling is employed in the same manner as is usual for pre-flared pipe. Since the sleeve 32 is no longer anchored to the pipe, it is adapted to rotate relative thereto, and in making up the connection the pipe does not rotate.

The coupling shown in Fig. 4 is similar in operation to that shown in Fig. 3, except that the female fitting 27 and male coupling member 32 of Fig. 3 are replaced in Fig. 4 by a male fitting 38 and a female coupling member 39. The fitting 38 is similar in construction to the fitting 10 of Figs. 1 and 2, and is similarly secured in the orifice of a passage in a structure 14. Its leading end portion has external threads 40 and a conical flare-engaging projection 41. The opposite coupling member or nut 39 has a bore 42 for slidably receiving a length of ductile pipe 43 and comprises a cavity 44 with internal threads 45, and a conical flare-engaging surface 46 at the inner end thereof where it joins the rearwardly extending bore 42. Intermediate the ends of the bore, the nut 39 has a plurality of threaded lateral apertures 47 for receiving set screws 48.

In using this form of coupling, the nut 39 is placed over the end of the pipe 43 with a portion of the latter projecting from the inner end of the bore 42, adjacent the conical flare-engaging surface 46. Set screws 48 are tightened to anchor the nut 39 to the pipe, and the nut is then threaded onto the leading end portion of the fitting 38. The projecting end portion of the pipe 43 is thereby forced to ride up over the conical surfact 41 on the leading end of fitting 38 and is flared thereby. Finally, the flared portion of the pipe is clamped between conical surface 46 of the nut 39 and the conical projection on the fitting forming a leaktight joint between the pipe 43 and said fitting.

In this form of coupling, when used in the foregoing manner, it is likewise necessary that the pipe 43 rotate relative to the fitting 38 in making up the connection. Accordingly, if such rotation is impractical when the fitting 38 is installed on the structure 13, the coupling can be used as a flare-forming tool in the same manner as described in connection with Fig. 3; and after the flare is formed the set screws 48 can be loosened or removed and the coupling made up in the usual manner for connecting pre-flared ductile pipe.

Variations and modifications may be made within the scope of this invention and portions of the improvements may be used without others.

I claim:

1. A coupling for threadless ductile metal tubing comprising a body member having a flare-forming and flare-seating conical projection having the diameter of its outwardly facing small end not greater than the internal diameter of the tubing, a draft member having screw thread engagement with the body member, and a sleeve connected to the draft member to travel therewith toward the body, said sleeve having a bore slidably receiving the end of the tubing and having a conical seat facing and conforming to the shape of said conical projection on the body, said sleeve having at least one setscrew positioned to engage the tubing for mechanically coupling the sleeve to the tubing therein for advancement therewith with the end of the tubing projecting a determinate distance beyond the seat on the sleeve, whereby when the draft member is advanced the projecting end of the tubing is extruded over the conical projection on the body and clamped between the latter and the conical seat on the end of the sleeve.

2. The invention as defined in claim 1, in which the sleeve is integral with the draft member and the setscrew on the sleeve is accessible for operation while the draft member and body are joined.

3. The invention as defined in claim 1, in which the sleeve is rotatably and slidably mounted in the draft member whereby the sleeve is positioned and secured to the tubing before the draft member is screwed onto the body member.

STEPHEN GUARNASCHELLI.

REFERENCES CITED

The following references are of record in the file of this patent:

UNITED STATES PATENTS

| Number | Name | Date |
| --- | --- | --- |
| 515,893 | Baily | Mar. 6, 1894 |
| 802,853 | Gardner and Davis | Oct. 24, 1905 |
| 1,774,841 | Parker | Sept. 2, 1930 |
| 2,128,459 | Guarnaschelli | Aug. 30, 1938 |
| 2,466,057 | Somma | Apr. 5, 1949 |

FOREIGN PATENTS

| Number | Country | Date |
| --- | --- | --- |
| 548,029 | Germany | Apr. 6, 1932 |